Jan. 27, 1942.　　W. H. LONGSTREET　　2,271,268
PRESSURE GAUGE
Filed March 2, 1939　　2 Sheets-Sheet 2
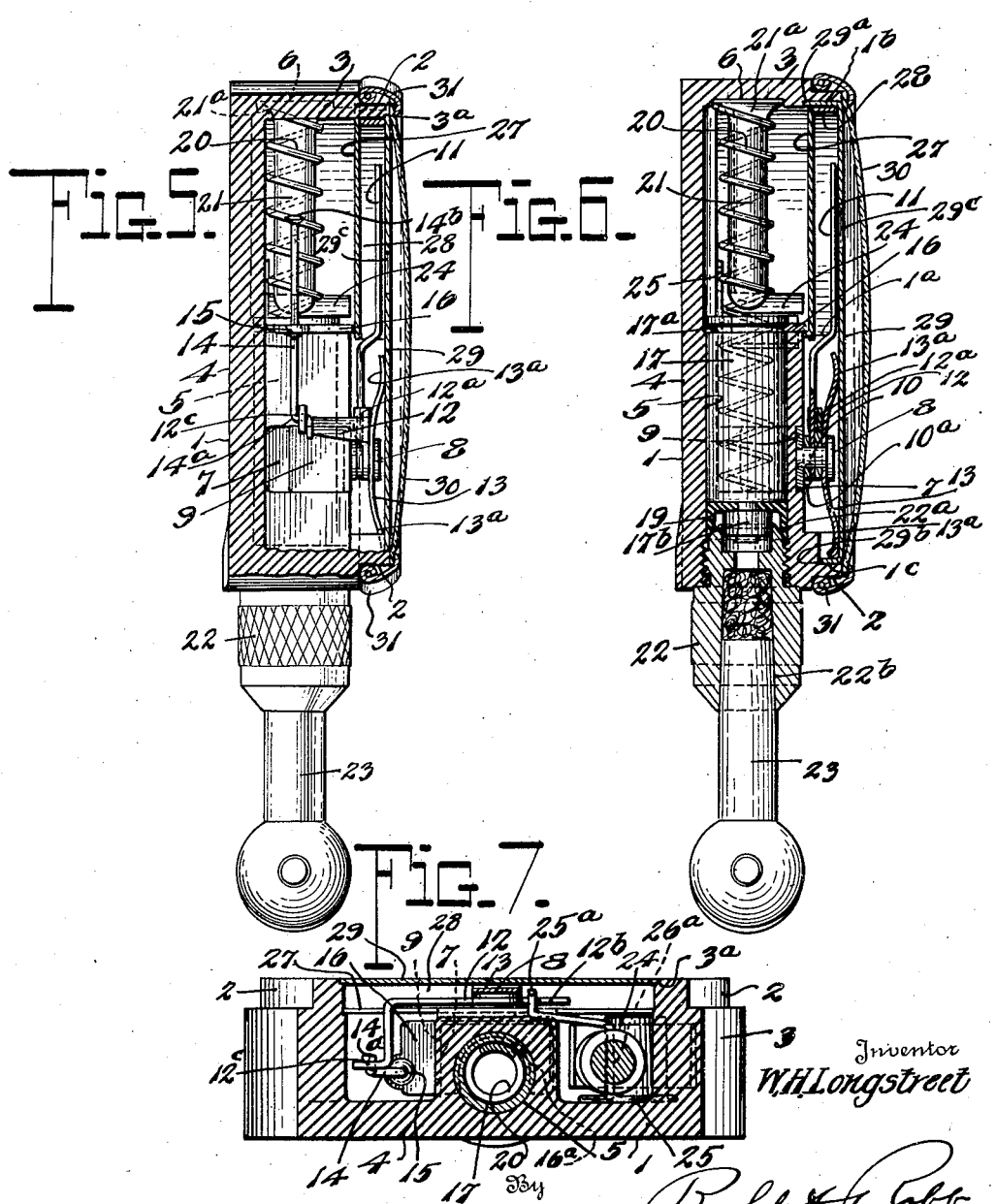

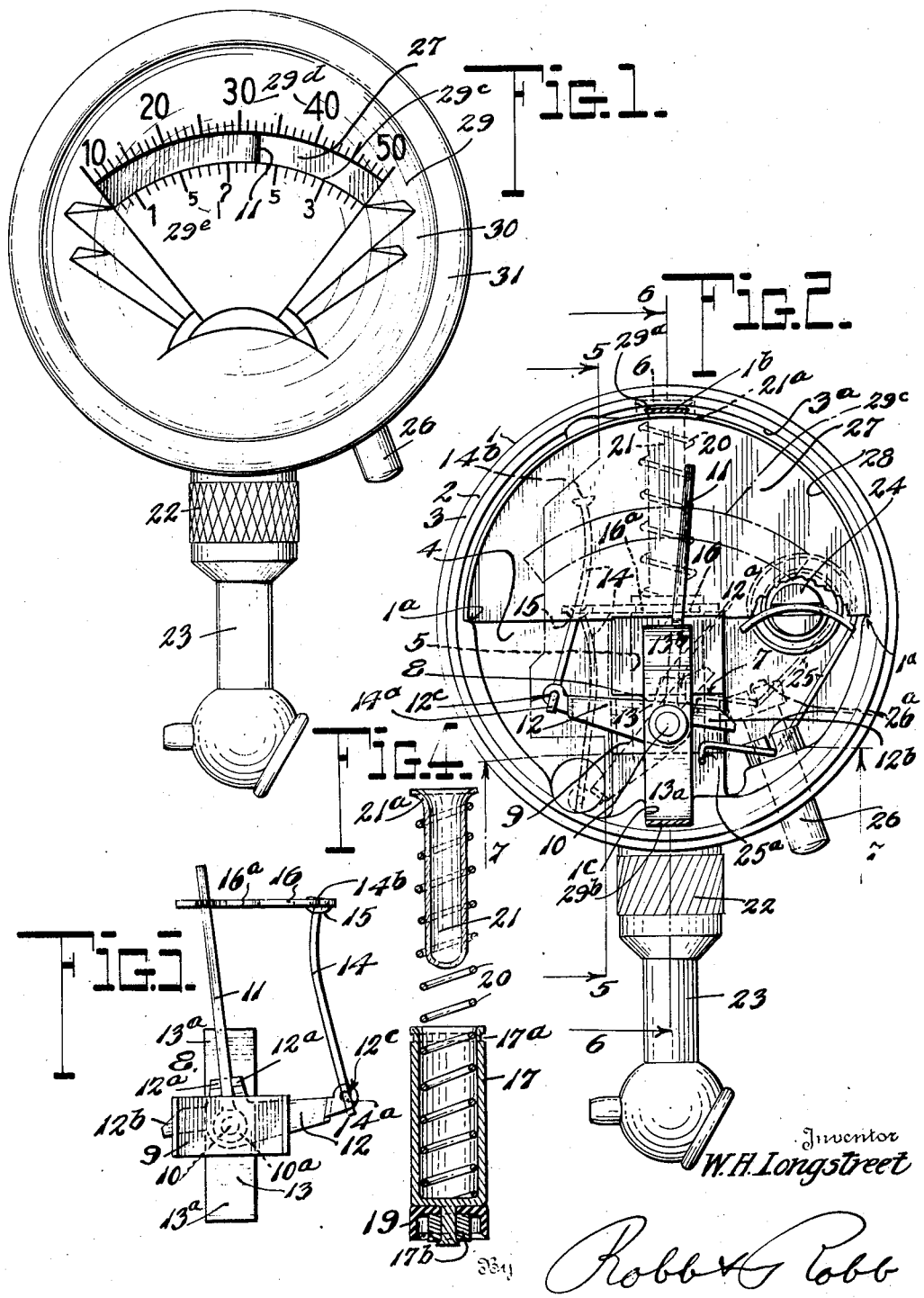

Patented Jan. 27, 1942

2,271,268

UNITED STATES PATENT OFFICE 2,271,268

PRESSURE GAUGE

Walter H. Longstreet, Brooklyn, N. Y., assignor to Acme Air Appliance Company, Inc., Brooklyn, N. Y., a corporation of New York Application March 2, 1939, Serial No. 259,457

13 Claims. (Cl. 73—111)

The present invention relates generally to pressure gauges, and more particularly gauges of the dial type used in gauging tire, tank and other pressures.

An object of the present invention is to provide a pressure gauge of the type described that is simple in construction, economical to manufacture, and capable of easy and convenient assembly or replacement of parts without the use of tools.

Another object is the utilization of pointer normalizing means to also retain the indicating unit in position in the casing during assembly of the parts.

A further object is the provision of a completely molded preferably non-metallic casing including an integral pressure cylinder.

Another object is the provision of spring means disposed on the indicating unit assembly to cooperate with the under surface of the dial for holding the indicator unit in position and provide the necessary frictional pressure for retaining the pointer in pressure-indicating position after a pressure gauging operation.

A further object resides in the utilization of a backing or closure plate cooperating with a plunger actuating plate carried by the piston to retain the actuating plate in operative position on the piston.

A further object is to provide a cup-shaped piston and cooperating guide stem seated in opposite sides of the casing and telescopically arranged with a direct acting spring interposed therebetween, permitting the employment of an extra long coil spring, which, due to its length, may be easily and accurately calibrated as to strength.

A still further object is the provision of a packing cup disposed on the outer end of a hollow piston with retaining means for securing it thereto and centralizing the piston, and the provision of a tire valve engaging nipple secured to the gauge casing having a piston cup expanding extremity and a socket to receive the extension while the piston cup is in contact with the expanding means.

Other and further objects and advantages of the invention will be hereinafter set forth and the novel features thereof defined by the appended claims.

In the drawings:

Figure 1 is a front elevation of a pressure gauge embodying the features of my invention.

Figure 2 is an elevation of the gauge shown in Figure 1 but with the transparent closure, its retaining bezel-ring, and the dial removed and parts being broken away, the dotted lines illustrating the normalizing plunger depressed to restore the indicator after a pressure reading has been made;

Figure 3 discloses the indicator unit, its operating link connection, and the associated removable plunger engaging plate;

Figure 4 is a vertical sectional view through the piston assembly unit;

Figure 5 is a vertical sectional view taken approximately on the plane indicated by line 5—5 of Figure 2 looking in the direction of the arrows;

Figure 6 is a similar view taken approximately on the plane indicated by line 6—6 of Figure 2, certain of the parts being shown in elevation; and Figure 7 is a horizontal sectional view taken approximately on the line 7—7 of Figure 2 and looking in the direction of the arrows.

Like reference characters designate corresponding parts in the several figures of the drawings.

Referring to the drawings, my improved pressure gauge includes a shallow cylindrical casing 1 molded of suitable, preferably non-metallic, material with an annular bezel-ring retaining shoulder 2 of the annular wall 3 outstanding from the back wall 4.

The interior of the casing 1 is formed with a somewhat elongated and rectangular enlargement extending from the back wall and the annular wall toward the center of the casing. This enlargement is formed with the bore 5 extending completely therethrough from a point substantially centrally of the casing to the exterior of said casing and constituting the pressure cylinder.

This pressure cylinder 5 is radially disposed in the casing at one side of the center. A guide stem and spring recess or seat 6 is formed in the wall of the casing opposite the pressure cylinder 5 and in axial alignment with said cylinder.

The enlargement forming the pressure cylinder is provided intermediate its length with lateral grooves or recesses 7 for retaining the indicating unit thereon, designated generally by the numeral 8. A U-shaped base plate 9 seated in the grooves 7 is provided with a post 10 projecting therefrom on which the pointer 11 is freely pivoted. The blade portion of the pointer is retained between the spaced shoulders 12a—12a formed on the lever 12 which in turn is pivotally mounted on the post 10.

The lever 12 is apertured at 12c and receives the bent extremity 14a of the link 14.

The link rod 14 is provided with a head portion 14b for engagement with a socket 15 in the piston plunger operating plate 16 later to be described.

Referring again to the indicator unit, the lever 12 is formed with a pointer normalizing tail portion 12b by means of which the pointer is returned to zero position after a pressure reading as will be later described.

The plate 16 is arranged to interlockingly engage the plunger 17 of the piston assembly unit, as seen more particularly in Figure 4.

This piston assembly comprises the piston plunger 17 of hollow cylindrical formation fairly closely fitting the wall of the cylinder 5. The upper end of the plunger 17 is formed with an annular groove 17a to receive the plate 16 as stated above, the plate being of a thickness corresponding to approximately the width of the groove and having a U-shaped slot 16a extending inwardly from one edge for interlockingly engaging the groove of the plunger.

The plate 16 thus engages the end of the enlargement containing the cylinder and thereby constitutes stop means for limiting outward movement of the plunger 17.

The plunger piston 17 carries a cup washer or leather 19 disposed on its end, and retained thereon, as seen in Figure 4, by the guide extension 17b suitably secured to the plunger.

A coil spring 20 is disposed within the plunger 17, one end thereof being seated on the closed end of the plunger 17. The other end of the spring receives or surrounds a hollow spring and plunger-guide-stem 21, the upper end 21a of which is flared outwardly and rests in the seat 6 of the casing. This guide stem projects toward the plunger 17 to a point adjacent the same when the plunger is in normal position supported by the plate 16, so that, upon inward movement of the plunger 17, it telescopes over the guide stem 21 with the spring 20 in between the inner surface of the plunger and the outer surface of the guide stem.

As before pointed out, the plate 16 disposed in the groove 17a on the piston plunger 17 limits the outward movement of the plunger under influence of the spring 20, which due to the hollow plunger construction, extends substantially entirely across the casing 1. The use of this relatively long coil spring permits the wire gauge and number of coils to be accurately determined for the desired opposing pressure on the piston.

The valve nipple 22, as seen in Figure 6 of the drawings, is formed with a beveled extremity 22a for engaging and expanding the free edge of the piston plunger leather 19 into contact with the cylinder wall.

The nipple 22 is tapered inwardly, as at 22b, to receive the valve chuck portion 23. This arrangement permits the chuck head 23 to be rotatably adjusted with respect to the gauge as desired.

Referring to Figures 2 and 7, the casing is formed with a slotted post 24 arranged to receive the normalizing spring 25. One end of this spring is interposed in the slot, and, after being spirally looped around the post adjacent the base of the casing, is bent at right angles outwardly to be received in the cross slot 26a of the normalizing plunger 26. The spring, after passing through this slot, is again bent at right angles to project outwardly across the plate 9 to a point adjacent the tail piece 12b of the lever 12. The tension of the spring normally maintains the normalizing plunger 26 in its projected position, as shown in Figure 2, with the bent extremity 25a disposed in slightly spaced relation to the tail piece 12b so as to permit actuation of the pointer and lever by the piston without any engagement of the lever 12 with the extremity 25a during pressure gauging.

The spring 25 also retains the plate 9 in the recess 7 formed in the enlargement containing the pressure cylinder during the assembly of the device and before the cover and dial are assembled to prevent accidental displacement of the plate 9 from its seat in the groove 7.

Inward manual pressure on the normalizing plunger 26 causes the bent extremity 25a to engage the tail piece of the lever 12 and thus swing the indicator or pointer 11 to the left to zero position.

The plate 16 is retained against accidental displacement from the piston plunger 17 by the backing plate 27 which is semi-circular in form and seated on a suitable ledge and shoulders 1a molded in the casing 1. Since this plate is directly in front of the piston and about on a plane with the front of the enlargement containing the pressure cylinder, it will be observed that after the plate 16 has been introduced on the plunger 17 this semi-circular backing plate 27 limits any displacement movement of the plate 16 from the plunger. The plate 27 also forms a closure for the inner portion of the casing and a background for the pointer 11.

The plate 27 is retained on its ledge by a semi-circular spacer strip or spring 28 which extends around one-half of the casing 1 between the shoulders 1a.

The main or indicia dial 29 rests on this strip 26 and on a slight ledge 3a of the wall 3. This dial is provided with inwardly bent tabs 29a and 29b adapted to be received in corresponding notches 1b and 1c formed in the casing 1.

The dial 29 forms a closure member for the open side of the casing and has an indicator sight opening 29c through which the pointer is visible after a pressure reading, as seen in Figure 1. Suitable pressure indicating indicia 29d in pounds per square inch, or indicia 29e in kilos per cubic centimeter may be provided adjacent the sight opening 29c.

A suitable transparent closure 30, preferably of a flexible or non-breakable nature, is provided, as shown in Figures 5 and 6. This closure rests on the dial closure member 29 and retains the same in position in the casing. The ring bezel 31 frictionally engages the exterior of the casing, and, when seated on the shoulder 2, retains the main dial 29, and, through the strip 28 the backing plate 27, which plate in turn retains the plate 16 on the plunger 17. The dial 29 also retains the pointer unit in position on the enlargement in the casing.

The indicator unit, as seen in Figures 2 and 6, carries a leaf spring 13, the outer portions 13a of which engage the under face of the dial closure member 29 exerting a seating pressure on the indicator assembly and maintaining the U-shaped clip 9 seated in the grooves 7 of the cylinder enlargement in the casing.

One end of this leaf spring is seated in the notch 1c of the casing preventing any relative rotary movement of this spring. This spring 13 also exerts a friction pressure on the lever 12 and pointer 11, since the spring 13 presses the lever 12 and pointer 11 against the spacing washer 10a on the post 10, and the relative friction between these parts is sufficient to retain the pointer in adjusted position after a pressure reading.

In the operation of the gauge, the chuck 23 is pressed onto the valve stem of a pressure fluid container, such as a pneumatic tire or tank, which depresses the valve in the usual manner, permitting the pressure fluid to pass through the chuck stem and the nipple 23 into the cylinder of the gauge forcing the piston plunger 17 upwardly causing the piston plunger, the guide stem 21 and the coil spring 20 to telescope. As the piston plunger moves upwardly, the head 14b of the link 14 engages the stop plate 16 rocking the lever 12 to the right, as seen in Figure 2. The pointer 11 carried by the lever 12 moves across behind the opening 29c in the dial 29. The gauge may then be removed from the valve stem whereupon the piston will again be forced outwardly by the spring carrying the stop plate along with it. However, the pointer will not move back due to the sliding connection between the stop plate and the link rod 14. The leaf spring engaging the rear face of the dial exerts sufficient pressure on the indicator lever to frictionally hold the same in its adjusted position. By observing the relation of the pointer 11 with respect to the indicia on the dial 29, the pressure in the tank or tire previously gauged may be noted. Referring to Figure 1, the pointer 11 indicates 32.5 pounds. In order to restore the pointer for subsequent gauging operations, the plunger 26 is pressed inwardly causing the upwardly bent extremity 25a of the spring 25 to engage the tail piece 12b of the lever 12, rocking the same to the left as shown in dotted lines in Figure 2.

In order to dismantle the device, the bezeling 2 is first pried off of the casing which permits ready withdrawal of the dial 29, whereupon the semi-circular spacer spring 28 may be snapped out of the casing releasing the semi-circular backing plate 27 which may be removed. After the backing plate is displaced, the stop plate on the piston is readily removed therefrom, and by displacing the free end 25a of the spring 25 slightly the indicator unit may be removed from the cylinder along with the plate. Swinging the link member 14 backwardly disengages the same from the aperture 12c in the end of the lever 12, whereupon this link may be withdrawn from the plate 16. Unscrewing of the nipple 22 now permits withdrawal of the piston, the spring, and the guide stem 21 from the casing. The curved retainer spring fitted in the slot of the post 24 may be lifted out, thus releasing the normalizing spring 25, which, after disengagement from the slot 26a of the plunger 26, may be lifted off of the post. Upon pressing inwardly on the plunger 26 this plunger may be withdrawn from its seat in the casing.

In the assembly of the device, the reverse operation takes place, and it will be observed that the device may, therefore, be readily assembled without the use of any tools whatsoever. Due to the elongated cup-shaped piston having its base disposed adjacent one side of the casing and the spring seat at the opposite side, an extremely long coil spring is employed which permits much easier calibration and correspondingly increased accuracy in the gauge than in the previous types of gauges where much shorter or smaller springs are used. The use of the guide stem telescopingly arranged with respect to the bore of the piston and the coil spring interposed therebetween permits an accurate guiding or axial movement of the piston and spring during a gauging operation, and the cooperation of the piston guide extension with the socket in the nipple positively supports the packing end of the piston centrally within the cylinder and with relation to the piston packing expanding means on the end of the nipple. Also, the disposition of the stop plate on the end of the piston limits the outward movement of the piston toward the expanding means, and, therefore, prevents undue pressure on the expanded packing cup 19. In assembled position it should again be observed that the semi-circular backing plate 27 effectively prevents removal of the stop plate from the piston. Also, it prevents removal of the curved spring disposed in the post 24. The dial retains this backing plate in position and also by its engagement with the opposite ends of the leaf spring 13 retains the indicator unit firmly seated in its socket on the cylinder.

Having thus described my invention, what I claim as new and desire to secure by Letters Patent is:

1. In a pressure gauge of the class described, a casing, a pressure cylinder formed therein having an exterior groove thereon, a piston plunger operable within said cylinder, an indicator device detachably disposed on said cylinder including a supporting plate having spaced arms engaging about said cylinder and disposed in the said groove, a pointer carried by said plate, and an operating connection between said piston plunger and said pointer for moving the pointer.

2. In a pressure gauge of the class described, a casing, having a spring receiving seat at one side, a cylinder within said casing at the other side thereof, a piston having a hollow plunger extending into said cylinder, stop means for limiting movement of said piston plunger outwardly of said casing, pressure indicating means operable by said stop means, and spring means seated in the hollow plunger at one end and in said casing spring seat at its other end for moving the plunger outwardly.

3. In a gauge of the class described, a casing having a cylinder formed therein at one side and a spring seat in the wall of the casing at the opposite side, an elongated hollow plunger disposed in said cylinder with the head of the plunger adjacent the wall opposite from said spring seat, a plunger and spring guide in the said spring seat projecting axially toward the mouth of said plunger and arranged to be telescoped relative to the plunger upon inward movement of said plunger, a compression coil spring extending substantially across said casing and disposed about said guide and in said plunger, removable stop means on the plunger for limiting movement of the plunger toward the exterior of the casing, and an indicator unit slidably connected to said stop means to be operated thereby.

4. In a pressure gauge of the class described, a molded non-metallic one-piece casing including a cylinder formed therein, a hollow plunger extending into said cylinder having an exterior groove formed therein adjacent one end thereof, an operating plate seated in said groove, an indicator mounted on said cylinder, an actuating connection between said indicator and said plate comprising a link member connected to the indicator and slidingly engaging said plate and formed with a shoulder for engaging said plate upon movement thereof in one direction to move the indicator in one direction, separate means for moving the indicator in the opposite direction, and a coil spring extending across the casing and seated at one end in said hollow plunger and at the other end on the inner wall of the casing.

5. In a pressure gauge of the class described, a casing, a cylinder within said casing, a hollow plunger extending into said cylinder having a flexible cup-shaped piston packing at its outer end, a packing spreader in the mouth of said cylinder, a stop plate detachably secured to the inner end of said plunger and engageable with said cylinder to limit the outward movement of said plunger toward said packing spreader, and a coil spring seated at one end on the wall of the casing and in said plunger at its other end to urge said plunger toward said packing spreader.

6. In a pressure gauge of the class described, a casing having a pressure cylinder, a plunger having a piston operable within said cylinder, an indicator unit disposed on said cylinder comprising a clip member interlocking with the sides of said cylinder, an indicator pivotally mounted on said clip, an apertured plate carried by said plunger, an operating link connected to said indicator and passing through the aperture of said plate and having an enlargement thereon engageable with one side of said plate upon movement of the piston in one direction to move the indicator in said direction only, and separate means for moving said indicator in the opposite direction.

7. In a gauge of the class described, a casing open at one side having a cylinder therein, a plunger having a piston operable within said cylinder, readily displaceable stop means on said plunger for limiting outward movement of said piston and removable through said opening in said casing, means for exerting outward pressure on said plunger to seat said stop means on the inner end of the cylinder, a pointer within the casing, an operating connection between the pointer and the stop means, and a backing plate disposed in the casing for retaining said stop means against displacement on said plunger.

8. In a gauge of the class described, a casing open at one side having a cylinder therein, a plunger having a piston operable within said cylinder, readily displaceable stop means interlockingly engaging said plunger for limiting outward movement of said piston and removable through the opening in said casing, means for exerting outward pressure on said plunger to seat said stop means on the inner end of the cylinder, a pointer within the casing, an operating connection between the pointer and the stop means, a backing plate removably disposed in the casing for retaining said stop means against displacement on said plunger, and an indicia carrying dial cooperating with said pointer and disposed on said casing to retain said backing plate in operative position in said casing.

9. In a pressure gauge, a casing, having a cylinder therein, an indicator unit within the casing, a hollow plunger operable in said cylinder formed with a guide extension and a piston cup washer at its outer end, plunger stop means removably disposed on the other end of said plunger to limit outward movement of said plunger, an air chuck nipple extending into the outer end of the cylinder and having means thereon for expanding the cup washer toward the walls of the cylinder, and formed with a guide extension receiving socket to receive the guide extension of the plunger and prevent lateral displacement of the outer end of the plunger when the cup washer is in engagement with said expanding means.

10. In a pressure gauge, a casing, a pressure cylinder within said casing, an indicator support removably seated on said cylinder, an indicator shiftably carried by said indicator support, an indicator operating piston within said cylinder, link means slidably connecting said piston to said indicator having a head at one end engageable with said indicator to move the same in one direction only upon movement of the piston and a manually shiftable indicator return element carried by said casing and having a portion overlying and engaging said indicator support to prevent movement of said indicator support away from its seat on said cylinder.

11. In a pressure gauge, a casing, a pressure cylinder therein, an adjustable indicator within said casing, piston means within said cylinder for operating said indicator, a link member connected at one end to said indicator and formed with an actuating head at its other end engageable with said piston means to actuate the indicator upon movement of the piston means in one direction only, friction means within said casing engaging said indicator to hold the indicator in its adjusted positions, and means for zeroizing said indicator.

12. In a pressure gauge of the class described, a casing open at one side and having an indicator unit supporting cylinder formed therein, a dial closure member for the open side of said casing, a piston operable in said cylinder, an indicator unit including a support removably seated on said cylinder, a pointer pivoted on the support and spring means on said support between said pointer and dial closure member and frictionally engaging said pointer to hold said pointer in its responsive positions, and an operating connection between said piston and said indicator to operate said pointer in one direction, and means for zeroizing said pointer.

13. In a pressure gauge, an open sided casing having a cylinder formed therein, a removable closure for said casing including an indicia carrying dial and means for retaining said dial on said casing, a piston operable within said cylinder, an indicator unit removably seated in the casing on said cylinder, said unit including a shiftable pointer adjustable to different positions relative to said indicia carrying dial, means connecting said piston to said pointer for operating said pointer in one direction, resilient means between the pointer and said dial tensioning said indicator unit toward its seat on the cylinder and frictionally engaging said pointer to hold the same in its adjusted positions, and means for zeroizing said pointer.

WALTER H. LONGSTREET.